United States Patent [19] [11] 4,169,826
Gilbert et al. [45] Oct. 2, 1979

[54] PROCESSES FOR DISPERSING INORGANIC ADDITIVES IN THERMOPLASTIC POLYMERS

[75] Inventors: Ronald E. Gilbert, Katy; Thomas J. Lynch, Houston; Robert J. Rowatt, Orange, all of Tex.

[73] Assignee: Gulf Oil Corporation, Pittsburgh, Pa.

[21] Appl. No.: 914,306

[22] Filed: Jun. 12, 1978

[51] Int. Cl.² ............................................. C08K 5/01
[52] U.S. Cl. ........................... 260/33.6 PQ; 260/34.2; 260/42.46; 260/42.57
[58] Field of Search ................... 260/42.57, 33.6 PQ, 260/34.2; 264/211

[56] References Cited

U.S. PATENT DOCUMENTS

| | | | |
|---|---|---|---|
| 3,492,231 | 1/1970 | McMillen | 260/22 R |
| 3,988,285 | 10/1976 | DeVrieze | 260/33.6 PQ |
| 4,039,507 | 8/1977 | Paige et al. | 260/33.6 PQ |

Primary Examiner—Lewis T. Jacobs
Attorney, Agent, or Firm—Richard L. Kelly

[57] ABSTRACT

An improved process is provided for incorporating finely-divided inorganic additives such as diatomaceous earth into thermoplastic polymers. The desired additive(s) are dispersed in a normally liquid hydrocarbon to form a Bingham fluid composition. These Bingham fluid compositions, while solid at ambient temperature and pressure, will flow under an applied pressure and can be pumped to feed the additive to a molten polymer. When this mixture is passed through a mixing apparatus such as an extruder, the additive is uniformly dispersed throughout the polymer. The process is particularly well suited to incorporate such additives into a molten ethylene polymer either as, or immediately after, the molten ethylene polymer is discharged from the reaction zone in which the polymer is prepared.

7 Claims, 2 Drawing Figures

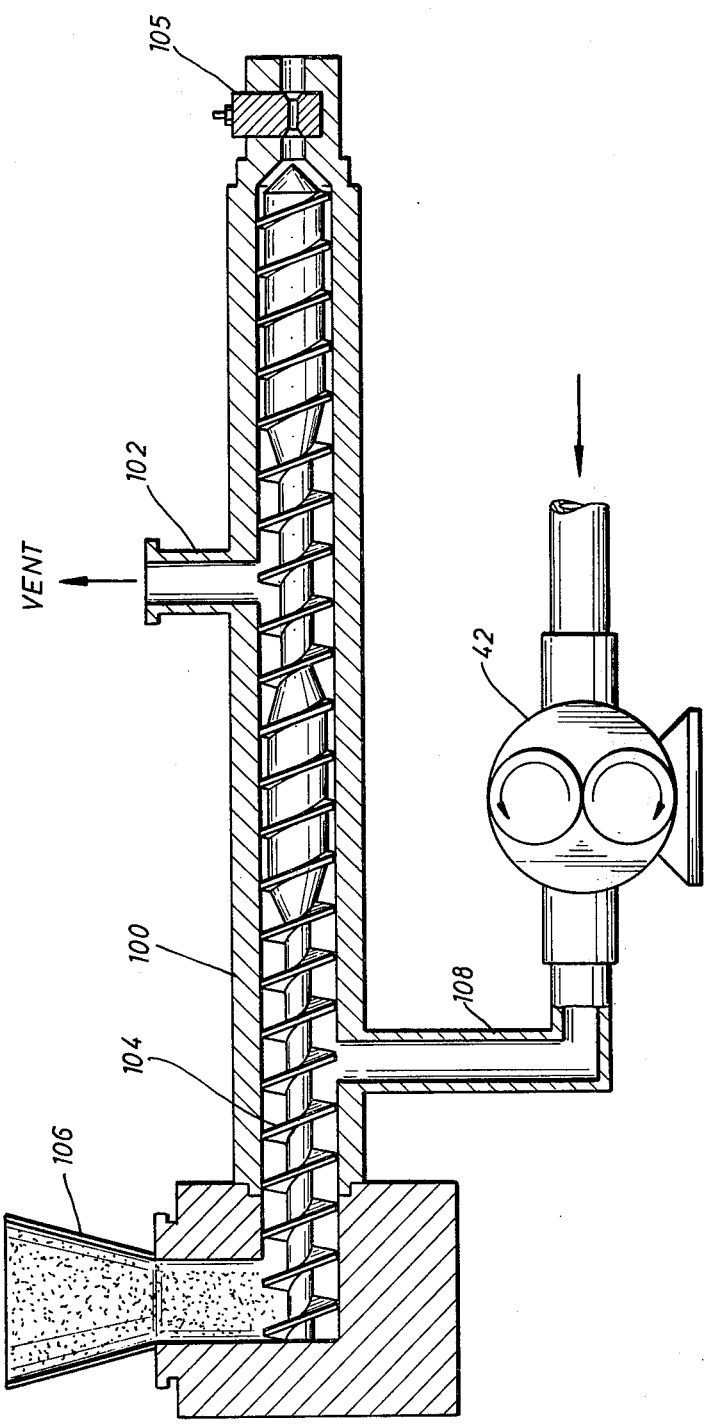

PROCESSES FOR DISPERSING INORGANIC ADDITIVES IN THERMOPLASTIC POLYMERS

BACKGROUND OF THE INVENTION

In the manufacture and sale of thermoplastic polymers, it is customary to introduce various additives into the polymer before such polymers are sold or used. Specifically, such additives are incorporated to stabilize the polymer against oxidation, deterioration from exposure to ultraviolet light, or to modify the tendency of films prepared from such polymers to stick to each other or "block." Many of the additives employed for this purpose are finely-divided solids. Polymers containing such additives frequently are referred to as compounded polymers.

The incorporation of additives into thermoplastic polymers presents greater difficulties than would be expected upon first consideration. This results from the fact that most additives are employed in low concentrations. In addition, many additives, particularly finely-divided solids, are not readily "wetted" and dispersed by highly viscous molten polymers. To overcome and/or minimize such problems, the art frequently uses master-batching techniques in which high levels of additives are incorporated into a polymer, which then is blended with additional "virgin" polymer to prepared compounded polymers having the desired concentration of the additive. The technique is used only out of necessity as it adds to the cost of preparing the desired compounded polymers. In addition, masterbatching introduces into the finished polymer an aliquot of polymer having an undesirably long heat history which adversely modifies certain polymer properties.

Certain thermoplastic polymers, particularly low density ethylene polymers and styrene polymers prepared by continuous mass polymerization processes, are discharged from the polymerization reaction zone in a molten state. The art has long recognized that the cost of manufacturing such polymers having additives dispersed therein could be reduced significantly if the desired additive(s) could be incorporated into the molten polymer, either as, or immediately after, the molten polymer is discharged from the polymerization zone. To date, the art has not developed satisfactory methods for incorporating additive(s) into such molten polymers at this point of their manufacture.

In view of the situations discussed above, there is a need in the art for developing an improved method for incorporating additive(s) into thermoplastic polymers.

SUMMARY OF THE INVENTION

The applicants have discovered that certain finely-divided inorganic additives can be readily dispersed into molten thermoplastic polymers by dispersing the desired additive(s) into a liquid hydrocarbon to prepare a Bingham fluid*, admixing the Bingham fluid composition with the thermoplastic polymer, and comalaxating said mixture. The Bingham fluid compositions can be pumped directly into the molten polymer in an extruder or like mixing apparatus. In the special case of ethylene polymers prepared by a continuous mass process, the Bingham fluid composition containing the additive(s) is incorporated into the molten polymer either as, or immediately after, the molten ethylene polymer is discharged from the reaction zone in which it is prepared.

*A Bingham fluid, sometimes referred to as a Bingham body, is a material which is a solid at a particular temperature under consideration, usually ambient temperature, but which will flow when subjected to an applied shearing stress which exceeds a minimum value characteristic of the system under consideration. For a description of the characteristics of Bingham fluids, see RHEOLOGY by Frederick Eirich, Academic Press Inc., New York City, Library of Congress Catalog Card 56-11131, particularly Volume 3, pages 198-201.

BRIEF DESCRIPTION OF THE DRAWINGS

FIG. 2 is a schematic representation of another form of apparatus for carrying out the process of the invention.

DETAILED DESCRIPTION OF THE INVENTION

Figure 1:
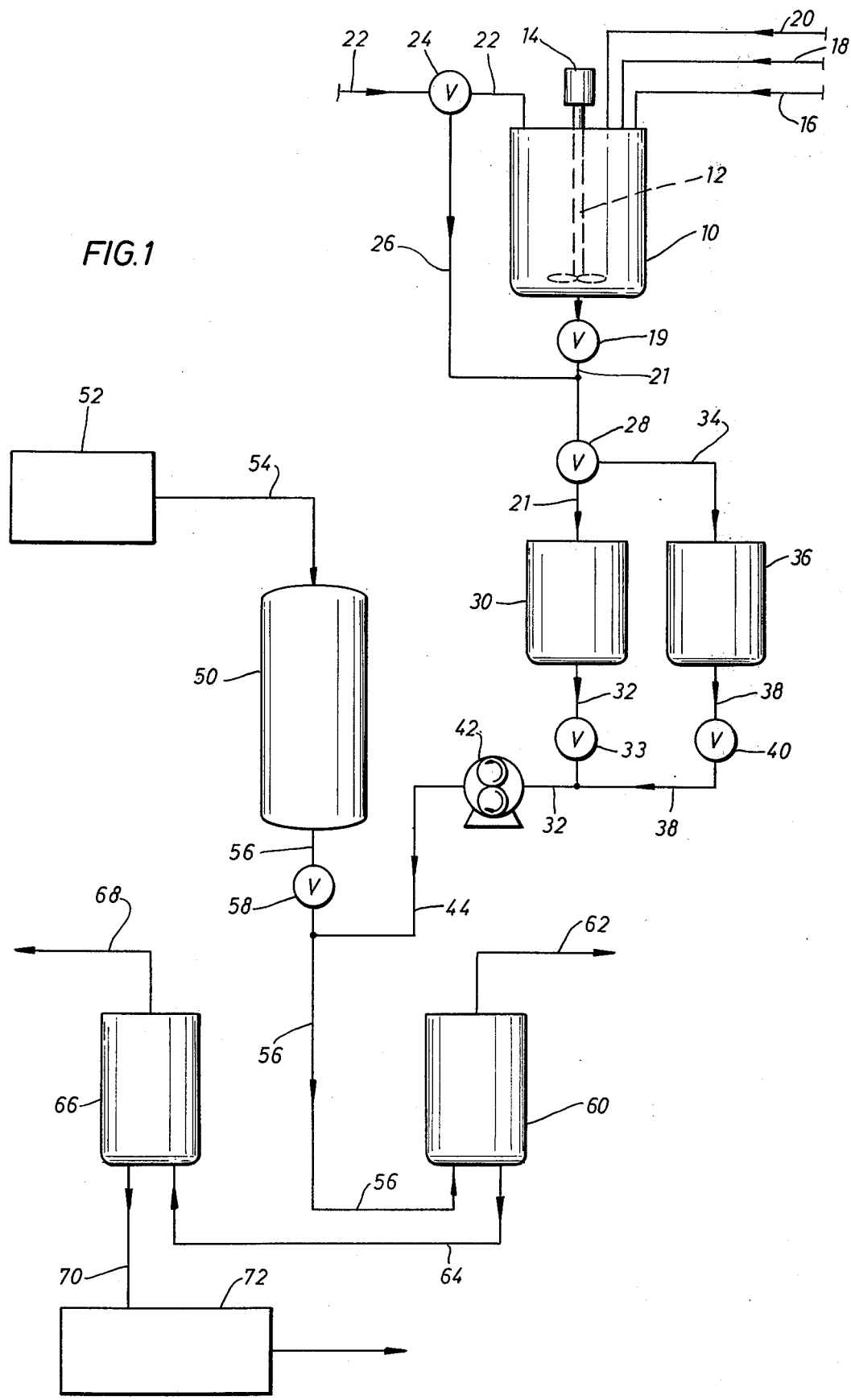
FIG. 1 is a schematic representation of one form of apparatus which can be employed to carry out the process of the invention in which an additive is incorporated into a molten ethylene polymer immediately after it is discharged from a polymerization reactor.

The continuous solid phase of the Bingham fluid compositions of the invention consists of an intimate dispersion of about 2-300 and preferably about 5-150 parts by weight of the finely-divided solid inorganic additive in 100 parts of a liquid hydrocarbon.

The continuous solid phase of the Bingham fluid compositions of the invention, in most instances, is not a true solid in a classical chemical and physical sense. Rather, it is a network of finely-divided additive particles dispersed throughout the liquid hydrocarbon. In many instances the additive particles may be bonded to each other in a semi-crystalline lattice. In certain physical characteristics, the continuous solid phase resembles a gel. Regardless of its precise chemical and/or physical state, for the purpose of describing and claiming the invention, the additive liquid hydrocarbon mixtures will be characterized simply as a "continuous solid phase." These blends, while solid at ambient temperature and pressure, flow readily under modest pressures of less than about 100 psig.*

*A few isolated solids such as extremely fine silicas prepared by the burning of organosilicon compounds cause these Bingham fluids to gel. Such compositions flow only under higher pressures.

The liquid hydrocarbon included in the Bingham fluid compositions can be any of the common hydrocarbons of either the aliphatic or aromatic type. It is preferred to employ relatively low boiling aliphatic hydrocarbons, particularly the pentanes, hexanes, heptanes, and octanes. The relatively low boiling hydrocarbons are preferred by reason of the ease by which they can be removed from the polymer by passing the polymer composition through a vented extruder as subsequently described. It is recognized that it sometimes is desirable to incorporate relatively high boiling liquid hydrocarbons and/or waxes into certain polymers such as high density ethylene polymers to serve as a cling additive or to modify the polymer's rheological properties. Where such hydrocarbons are desired in the final polymer composition, higher molecular weight hydrocarbons containing up to 40 carbon atoms, including wax-like solids, can be employed as the hydrocarbon component of the Bingham fluid compositions. Where the hydrocarbon is a wax-like solid at ambient temperature, the Bingham fluid compositions should be stored and pumped at temperatures at least slightly above the hydrocarbon's melting point.

The precise physical characteristics of the additive-liquid hydrocarbon dispersions will depend somewhat upon the chemical type and the boiling point of the liquid hydrocarbon, and the chemical type and particle size of the additive employed. The ratio of the two components also has an effect upon the physical properties of the resultant dispersions. It has been observed, however, that by proper selection of the additive and the liquid hydrocarbon and the proportions of the two components, it is possible to prepare compositions that are homogeneous at ambient temperature and will retain their single phase solid state over the normal range of ambient temperature encountered in the temperate zone, specifically from about 10° C. to about 40° C.

The continuous solid phases of the Bingham fluids described above, by reason of being based on a hydrocarbon that is a liquid at ambient temperature, are solids at ambient temperature and atmospheric pressure. If the Bingham fluids are to be employed at subambient temperatures and/or stored at pressures above atmospheric, it is possible to employ in the continuous solid phase lower boiling hydrocarbons such as butane, propane, propylene, or ethylene. These lower boiling hydrocarbons, for the limited purpose of the present invention, are considered to be liquid hydrocarbons.

It will be recognized, of course, that such systems must be maintained at temperatures and pressures below the critical point of the liquid hydrocarbon included in the Bingham fluid composition. The critical point for ethylene is 9.9° C. and 50.5 atmospheres. The use of ethylene as the liquid hydrocarbon is desirable where it is desired to hold the introduction of extraneous compounds into the polymer to an absolute minimum.

The finely-divided solid inorganic additive employed in the invention must meet two criteria. First, it must form a Bingham fluid with a liquid hydrocarbon. Second, when incorporated into a thermoplastic polymer, it must modify one or more of the polymer's properties. These inorganic additives, in most instances, serve in the polymer composition as an "anti-block" agent, or as a colorant, or as a sun screen type stabilizer. Certain of the additives serve two or more functional purposes. Solid inorganic additives which meet these two criteria include carbon black, titanium dioxide, talc, diatomaceous earth and some, but not all, siliceous materials. The operable siliceous materials contain a substantial quantity of hydroxyl groups chemically bonded to silicon atoms and can be considered to be polymeric materials containing the grouping

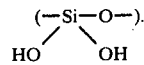

Typical examples of such siliceous materials include the products sold under the trade designation Cabosils*. Some natural occurring siliceous materials such as certain grades of diatomaceous earth function similarly. Siliceous materials consisting essentially of $SiO_2$ do not form Bingham fluids with liquid hydrocarbons and cannot be employed in the practice of the invention.
*Trademark of Cabot Corporation.

The solid inorganic additives employed in the invention will be finely divided with the majority of the particles having a size such that at least 50% of the solids will pass through a 50-mesh screen (U.S. Standard). In a preferred case, at least 50% of the solids will pass through a 100 mesh screen.

The lower ratio of inorganic additive to liquid hydrocarbon will be set by the necessity of forming a Bingham fluid and will vary somewhat with the particular inorganic additive and to a lesser extent with its particle size. With most systems of interest, a minimum of 2 parts and preferably 4 parts of the inorganic additive will be required per 100 parts of liquid hydrocarbon. The upper limit will be about 300 to 200 parts of inorganic additive per 100 parts of liquid hydrocarbon. For most systems of interest, 5–150 and preferably 10–100 parts of inorganic additive will be employed per 100 parts of the liquid hydrocarbon.

If desired, other additives, in addition to the solid inorganic additive, can be included in the Bingham fluid compositions to modify other properties of a thermoplastic polymer. Examples of such additional additive include materials such as hindered phenols, organophosphites, and the like which are incorporated into polymers to function as antioxidants, stabilizers, and the like. Another example of such additives includes so-called slip agents such as the long chain fatty acid amides, particularly oleamide and erucamide. Yet another example of such additives includes antistat agents such as glyceryl monooleate, glyceryl monostearate, and the like. Still another example of such additives includes $C_{20}$ to $C_{40}$ hydrocarbons which sometimes are included in olefin polymers as cling additives.

The physical state of the Bingham fluid compositions will be determined by the nature of the additives included therein. If only a finely-divided inorganic additive is employed, the Bingham fluid will consist of a homogeneous continuous solid phase. If a second type of additive is included, and the second additive is a solid which is not soluble in a liquid hydrocarbon, the final composition will consist of a uniform dispersion of the second solid additive in the continuous solid phase. When the second additive is a liquid not soluble in the liquid hydrocarbon, the final composition will consist of a uniform dispersion of the liquid additive in the continuous solid phase. When the second additive is soluble in the liquid hydrocarbon, the final composition will be a homogeneous solid phase having the additive dissolved therein.

A desirable characteristic of the invention is that the liquid hydrocarbon included in the Bingham fluid compositions is essentially inert and has no adverse effect on the polymers to which the Bingham fluid compositions are added. The liquid hydrocarbon can be vented in passing the thermoplastic polymer through a vented extruder.

The process of the invention can be used to incorporate the solid additives into virtually any type of thermoplastic polymer into which additives conventionally are incorporated. Typical examples included both low density and high density ethylene polymers, propylene polymers, styrene polymers and the like. The Bingham fluid compositions and the polymer are suitably mixed and comalaxated in an extruder (preferably vented to remove the liquid hydrocarbon), a Banbury mixer, or like apparatus. The method of the invention offers significant operational advantages in that the Bingham fluid composition can contain a low concentration of the desired additive. Thus, by using a relatively large quantity of the Bingham fluid composition, it is possible to obtain a more uniform blend of the additive and the polymer.

In a preferred embodiment of the invention, the polymer is fed to an extruder or like mixing apparatus such as a Farrel continuous mixer and the Bingham fluid composition is pumped into the melted polymer at a continuous preselected rate. The invention has particular advantages in incorporating additives into low density ethylene polymers which are discharged from a polymerization reactor in a molten state. The Bingham fluid composition can be pumped into the molten polymer either as, or immediately after, the molten polymer is discharged from the polymerization zone. As used herein and in the appended claims, the term "immediately after" means at any downstream processing point before the molten polymer is cooled and solidified.

The Bingham fluid compositions employed in the invention are prepared by stirring the desired additive and the liquid hydrocarbon in a suitable vessel. This mixture is agitated with sufficient intensity to disperse the additive uniformly throughout the liquid hydrocarbon. When the stirring is terminated, the mixture solidifies. The solidified mixture then is transferred to a suitable storage vessel.

FIG. 1 illustrates apparatus for preparing a suitable Bingham fluid composition and injecting it into a molten low density ethylene polymer as it is discharged from a high pressure autoclave polymerization reactor. The apparatus includes a reactor 10 provided with a stirrer 12 driven by a motor 14. The reactor 10 is constructed so that it can operate under an applied pressure of at least about 100 psig. Lines 16, 18, and 20 are provided to feed to the reactor, respectively, a liquid hydrocarbon, a finely-divided solid inorganic additive, and any additional additives which are to be included in the Bingham fluid composition. A gas line 22 fitted with a two-way valve 24 is provided so that the reactor 10 can be pressurized to discharge the Bingham fluid composition from reactor 10 via outlet line 21, which contains a valve 19. Line 21 is connected to storage vessel 30. A two-way valve 28 is provided in line 21 so that the Bingham fluid composition from reactor 10 also can be fed through line 34 to a second storage vessel 36 which is maintained in parallel with storage vessel 30. A transfer line 32 equipped with a valve 33 is provided in storage tank 30 so that the Bingham fluid composition contained therein can be transferred therefrom by means of gear pump 42. In a like manner, an outlet line 38 equipped with a valve 40 is provided in storage tank 36 for feeding the Bingham fluid composition through line 32 to gear pump 42.

In the preparation of the Bingham fluid composition, a liquid hydrocarbon is introduced into reactor 10 through line 16, and the finely-divided solid inorganic additive is fed to reactor 10 through line 18. The additive and the liquid hydrocarbon are stirred to provide a homogeneous dispersion of the additive in the liquid hydrocarbon. If a second type of additive is to be included in the Bingham fluid composition, it then is fed to reactor 10 via line 20. Stirring is continued to thoroughly disperse the second additive in the composition. The lines 16, 18, and 20 then are sealed by suitable valves not shown and the reactor is pressurized by an inert gas introduced into the reactor via line 22. Valves 19 and 28 are opened and the Bingham fluid composition in reactor 10 is transferred via line 21 to storage tank 30.

To assure that an adequate supply of Bingham fluid composition is available at all times, the operations above-described are repeated with the exception that valve 28 is turned so that the Bingham fluid composition prepared in reactor 10 is transferred to the second storage tank 36.

With the storage tanks 30 and 36 filled with the desired Bingham fluid composition, the apparatus is in a condition to feed the Bingham fluid composition into molten ethylene polymer being discharged from polymerization reactor 50. Valve 19 is closed and valves 24 and 28 are set so that gas from line 22 is fed through line 26 into line 21 so as to apply a pressure on the contents of storage tank 30. The pressure applied on storage tank 30 converts the Bingham fluid composition to the liquid phase and forces the composition through line 32 and valve 33 to gear pump 42 which feeds the composition through line 44 to output line 56 of polymerization reactor 50. Polymerization reactor 50 is a high pressure stirred autoclave which typically will operate at pressures in excess of 1,000 atmospheres and at temperatures in excess of 200° C. Polymerization grade ethylene is fed to reactor 50 from compressor 52 via line 54. A polymerization initiator will be fed to reactor 50 by suitable means not shown. Product is continuously discharged from reactor 50 via line 56 and valve 58, and typically will contain 10–15 weight % ethylene polymer and the balance unconverted ethylene. The Bingham fluid composition entering line 56 via line 44 is intimately dispersed in the hot molten ethylene polymer. Line 56 discharges into a high pressure separator 60 which typically operates at a pressure of about 200 atmospheres and a temperature of about 230° C. Unpolymerized ethylene, the wax component of the Bingham fluid, and the liquid hydrocarbon component of the Bingham fluid are discharged via line 62 for recovery and/or recycling. The molten ethylene polymer and the additive component of the Bingham fluid are transferred via line 64 to a low pressure separator 66 which typically operates at a pressure of about 10 atmospheres and at a temperature of about 200° C. Any residual volatile products are recovered via line 68 and the molten polymer containing the additive is discharged via line 70 to an extruder 72.

In the drawing, the Bingham fluid composition is fed into the molten ethylene polymer at a point intermediate of the reactor and the high pressure separator. If desired, the Bingham fluid can be introduced into the molten polymer downstream from either the high pressure separator or the low pressure separator, or in the extruder 72.

To prepare Bingham fluid compositions containing a normally gaseous hydrocarbon such as ethylene as the liquid hydrocarbon component of the Bingham fluid compositions, it is necessary to operate at reduced temperature and elevated pressures. The reactor 10, if necessary, is modified to operate at a pressure well in excess of 50 atmospheres. The reactor 10 is sealed and charged with the finely-divided solid additive. Ethylene then is admitted to reactor 10 at a pressure well in excess of 50.5 atmospheres. Reactor 10 is cooled to a temperature well below 9.9° C. to liquify the ethylene. Stirring is then provided to disperse the solid additive throughout the liquid ethylene. Valves 19 and 28 are opened to transfer the Bingham fluid composition to storage vessel 30 which will be maintained well below 9.9° C. Valve 19 is closed and valves 24 and 28 are adjusted so that storage vessel 30 is maintained under an ethylene pressure in excess of 50.5 atmospheres. When valve 33 is opened, the Bingham fluid composition will flow through line 32 to gear pump 42. Line 32, valve 33, gear pump 42, and line 44 will be maintained at a temperature below 9.9° C.

FIG. 2 illustrates apparatus for incorporating a functional additive into a thermoplastic polymer which initially is prepared and recovered in particulate form. A typical polymer of this type is a high density ethylene polymer prepared in a particle form reactor. The apparatus is a modified two-zone vented compounding extruder which includes a barrel 100, a vent 102 in the barrel, a screw 104, an adjustable discharge valve 105, and a feed hopper 106. As will be recognized by those skilled in the art, screw 104 is constructed to provide in the extruder, as viewed from left to right in the drawing, a plasticizing (melting) section, a metering (pumping) section, a decompression (venting) section, and a second metering (pumping) section. A line 108 fed by gear pump 42 is provided to feed the Bingham fluid composition into the molten polymer in the plasticizing (melting) section of the extruder. Conventional extruder components not essential to an understanding of the operability of the invention are not shown. Such components include, inter alia, a drive mechanism, heating and/or cooling means, filter screens, and the like.

In operation, the polymer is continuously fed to the extruder at a uniform rate from hopper 106. As the resin is advanced and melted, a Bingham fluid composition containing the desired additive(s) is pumped by gear pump 42 via line 108 into the extruder at a uniform rate. With most systems of interest, the pressure in line 108 will be higher than the pressure in the plasticizing (melting) section of the extruder. Consequently, molten polymer does not flow into line 108. If desired, however, a one-way valve can be included at the exit port of line 108. As the mass of polymer and Bingham fluid composition moves through the extruder, the additive is dispersed throughout the polymer. When the molten polymer passes through the decompression (venting) section, the liquid hydrocarbon of the Bingham fluid composition will be vented from the polymer via line 102. The polymer discharged through discharge valve 105 will have the additive uniformly dispersed throughout the polymer.

The following examples are set forth to illustrate more clearly the principle and practice of this invention to those skilled in the art. When parts and percentages are mentioned, they are parts and percentages by weight unless otherwise specifically noted.

EXAMPLE 1

Hexane in the amount of 716 gms was charged to reactor 10 which had a 3-liter capacity. Finely-divided diatomaceous earth in the amount of 100 gms was charged to the reactor. The mixture was stirred to prepare a uniform dispersion of the diatomaceous earth in the hexane. Valves 19 and 28 were opened and a nitrogen pressure of 50 psig was introduced into reactor 10 by line 22 to transfer the contents of reactor 10 to storage tank 30.

PART B

The Bingham fluid composition of Part A was fed to molten ethylene polymer being discharged from an autoclave reactor at a rate such that the recovered ethylene polymer contained about 0.01 weight % diatomaceous earth. Film prepared from this polymer composition had antiblock properties comparable to those obtained when film is prepared from similar polymer compositions in which the diatomaceous earth is dispersed into the ethylene polymer in a compounding extruder.

EXAMPLE 2

Part A

A Bingham fluid composition suitable for use in injecting a total additive package into a film grade low density ethylene polymer was prepared from 750 ml of hexane, 190 grams of diatomaceous earth, 450 grams of erucamide, and 380 grams of an antioxidant.

PART B

The Bingham fluid composition of Part A was fed to molten ethylene polymer being discharged from an autoclave reactor at a rate such that the recovered ethylene polymer contained about 0.01 weight % diatomaceous earth, about 0.02 weight % of the antioxidant, and about 0.024 weight % of erucamide. Film prepared from this polymer composition had properties comparable to those obtained when film is prepared from similar polymer compositions in which the additive package is dispersed into the ethylene polymer in a compounding extruder.

What is claimed is:

1. In a process in which finely-divided solid inorganic additive is incorporated into and dispersed in a thermoplastic polymer by comalaxation at a temperature above the softening temperature of the polymer; the improvement which consists essentially of admixing with said thermoplastic polymer a Bingham fluid composition and comalaxating said mixture, said Bingham fluid composition being a solid at ambient temperature and capable of flow under an applied pressure, the continuous solid phase of the Bingham fluid composition being an intimate dispersion of a finely-divided inorganic solid additive in a liquid hydrocarbon, said inorganic additive being selected from the group consisting of carbon black, titanium dioxide, talc, diatomaceous earth and siliceous materials having a substantial quantity of hydroxyl groups chemically bonded to silicon atoms.

2. A process for dispersing a finely-divided solid inorganic additive into an ethylene polymer which consists essentially of pumping a Bingham fluid composition into a mass of molten ethylene polymer, either as, or immediately after, the molten ethylene polymer is discharged from the polymerization zone in which it was prepared, said Bingham fluid composition being a solid at ambient temperature and capable of flow under an applied pressure, the continuous solid phase of the Bingham fluid composition being an intimate dispersion of a finely-divided inorganic solid additive in a liquid hydrocarbon, said inorganic additive being selected from the group consisting of carbon black, titanium dioxide, talc, diatomaceous earth and siliceous materials having a substantial quantity of hydroxyl groups chemically bonded to silicon atoms.

3. A process of claim 1 or 2 in which the Bingham fluid composition has about 2 to 300 parts by weight of the finely-divided inorganic additive dispersed in 100 parts by weight of the liquid hydrocarbon.

4. A process of claim 1 in which the thermoplastic polymer is passed through an extruder and the Bingham fluid composition is pumped into the melted polymer in said extruder.

5. A process of claim 1 or 4 in which the thermoplastic polymer is selected from the group consisting of ethylene and propylene polymers.

6. A process of claim 1, 2, or 4 in which the inorganic additive is diatomaceous earth.

7. A process of claim 1, 2, or 4 in which the inorganic additive is carbon black.

* * * * *